March 15, 1927.  1,621,203
C. R. HOUGHTON
PRESSURE TEMPERATURE COMPENSATOR AND SLIP INTEGRATOR FOR METERS
Filed Aug. 31, 1925   3 Sheets-Sheet 1

INVENTORS
Carl R. Houghton
BY
Hood & Hahn
ATTORNEYS

March 15, 1927.
C. R. HOUGHTON
1,621,203
PRESSURE TEMPERATURE COMPENSATOR AND SLIP INTEGRATOR FOR METERS
Filed Aug. 31, 1925   3 Sheets-Sheet 2
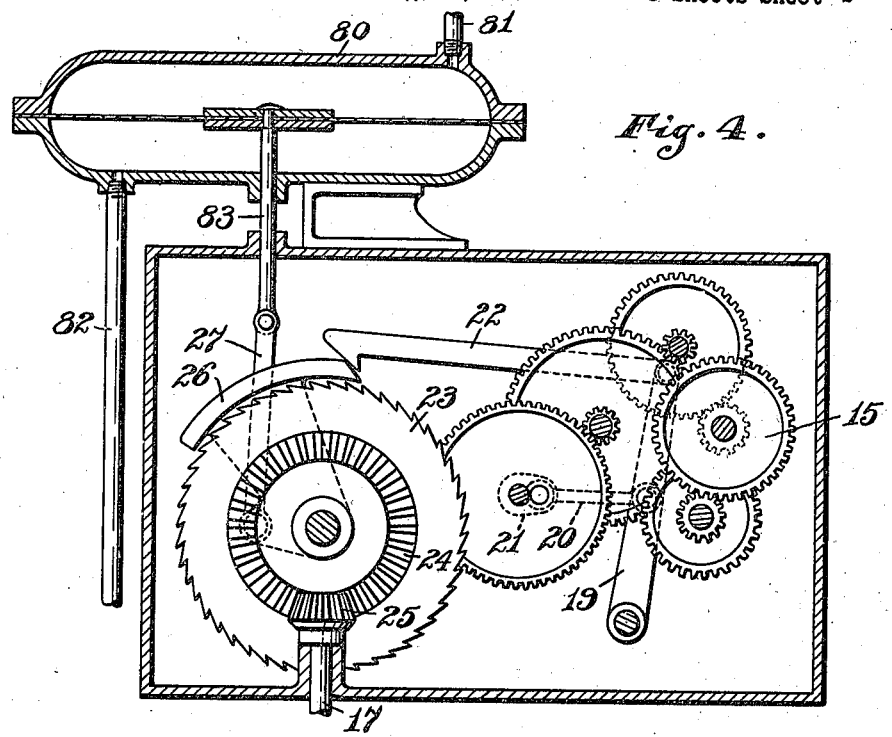
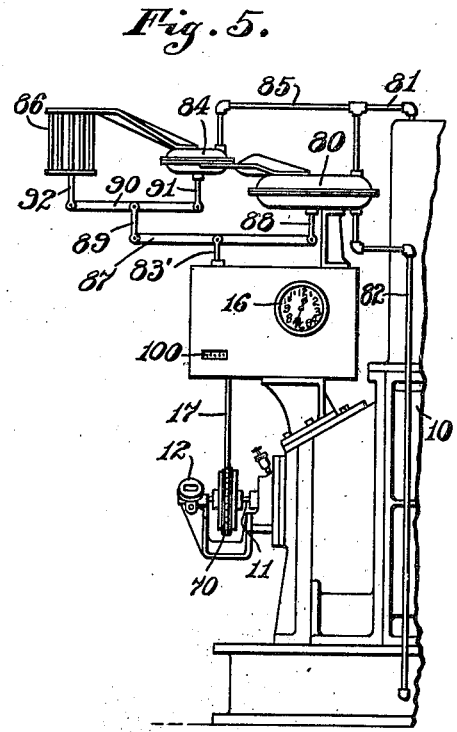
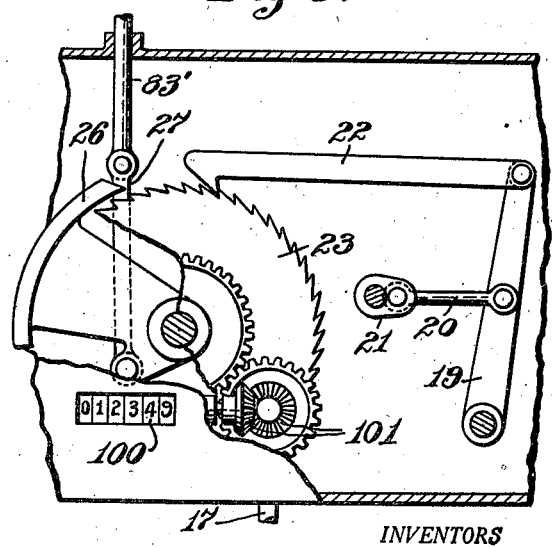
INVENTORS
Carl R. Houghton
BY
Hood & Hahn
ATTORNEYS March 15, 1927.
C. R. HOUGHTON
1,621,203
PRESSURE TEMPERATURE COMPENSATOR AND SLIP INTEGRATOR FOR METERS
Filed Aug. 31, 1925   3 Sheets-Sheet 3
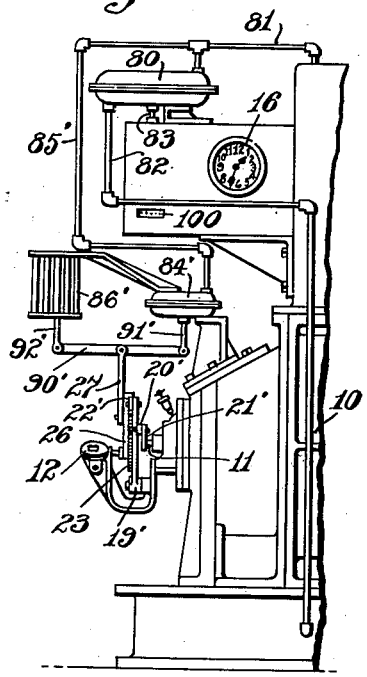
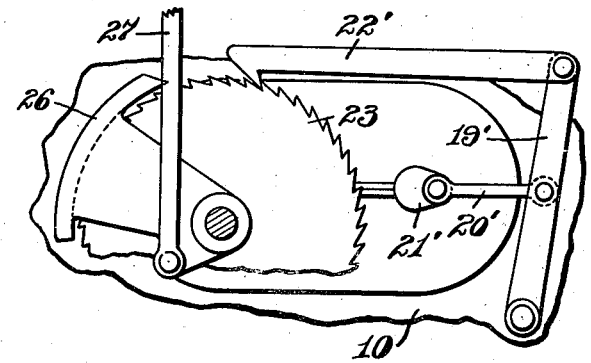
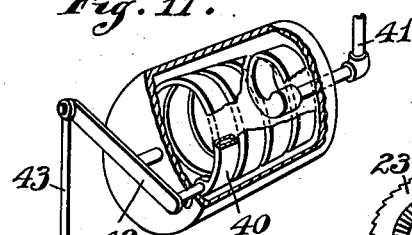
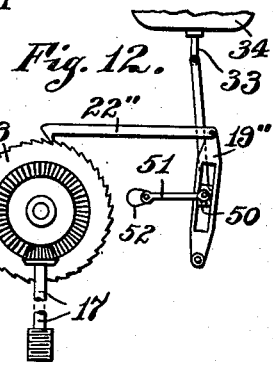
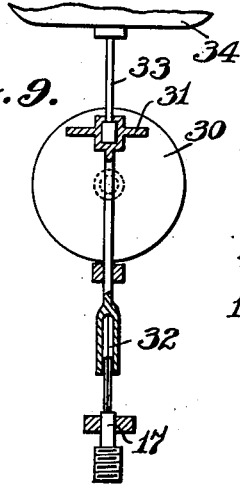
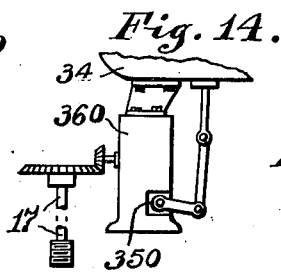
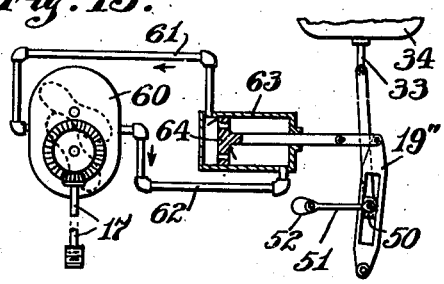
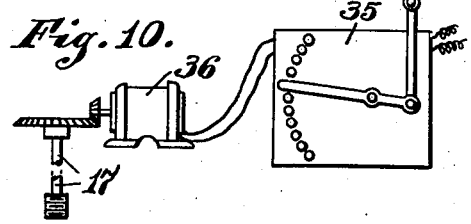
INVENTORS
Carl R. Houghton
BY
Hood + Hahn
ATTORNEYS Patented Mar. 15, 1927.

1,621,203

UNITED STATES PATENT OFFICE.

CARL R. HOUGHTON, OF CONNERSVILLE, INDIANA, ASSIGNOR TO THE CONNERSVILLE BLOWER CO., OF CONNERSVILLE, INDIANA, A CORPORATION OF INDIANA.

PRESSURE TEMPERATURE COMPENSATOR AND SLIP INTEGRATOR FOR METERS.

Application filed August 31, 1925. Serial No. 53,545.

In the use of meters of the lobed impeller type, such as shown in Patent No. 1,528,728, there is an unavoidable slip or leakage of gas past the lobes, the amount of this leakage being dependent upon the speed of the meter, the pressure differential, temperature and supply pressure.

If the speed of the meter were uniform the ratio of slip or leakage to total delivery might be established and the counter so calibrated as to automatically approximately integrate the slip into the counter, but as the slip varies inversely with the speed and directly with the pressure differential and temperature, and as delivery demand is seldom exactly uniform and consequently speed is unavoidably variable, it is apparent that such an attempt at integration would result in only approximate measurement of that portion of the gas which slips past the impellers.

The object of my present invention is to provide mechanism by which the above mentioned "slippage" gas may be integrated into the counter with more or less accuracy, depending upon the character of the mechanism and the number and kind of variables which are provided for, the construction being such as to measure the "slippage" gas even when the primary measuring elements of the meter are stationary because of a low duty demand. A further object is to provide mechanism by which compensation is made in the counter for variations of gas pressure and for variations in temperature, from desired standards, so that counter readings will indicate the volume of gas at a standard temperature—say 60° F. and at a standard absolute pressure—say 14.7 pounds per square inch.

Figure 1:
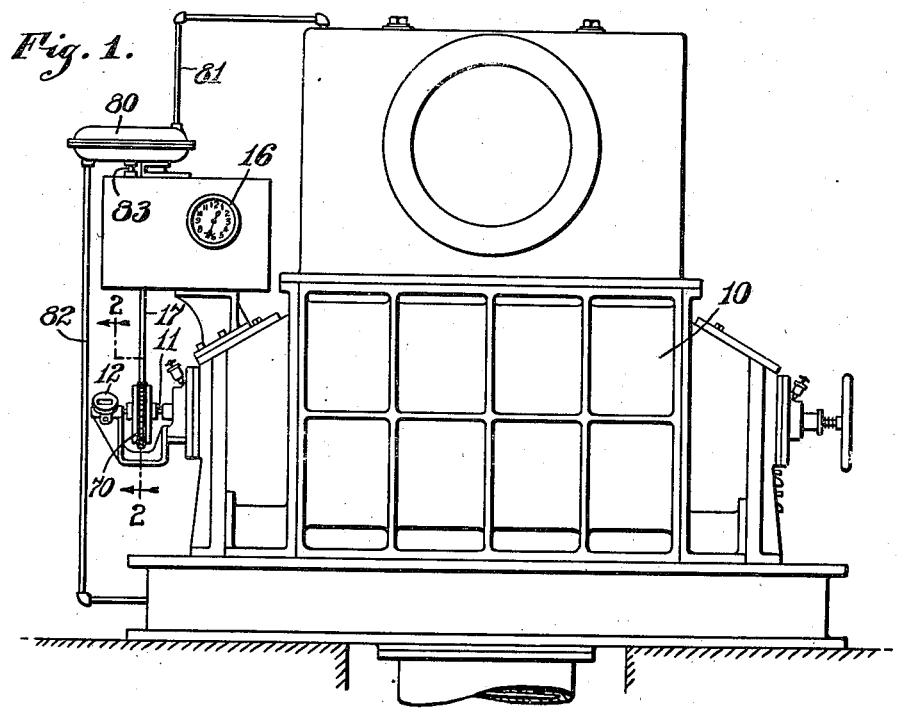
Figure 2:
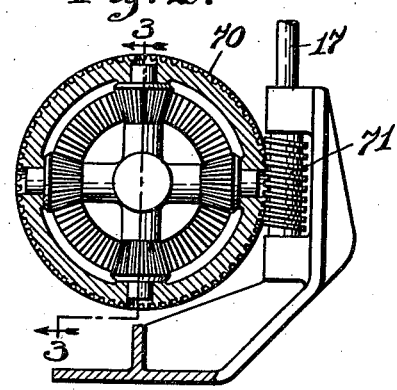
Figure 3:
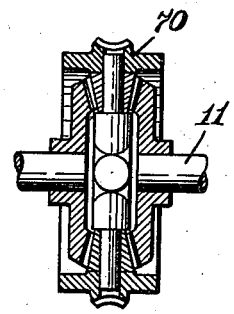

The accompanying drawings illustrate, largely diagrammatically, various embodiments of my invention, Fig. 1 being a side elevation of my invention designed to integrate "slippage" gas under conditions which take account only of the pressure differential of the meter; Fig. 2 a section, on an enlarged scale, on line 2—2 of Fig. 1; Fig. 3 a section on line 3—3 of Fig. 2; Fig. 4 a fragmentary vertical section of the time train and associated parts forming part of the apparatus shown in Fig. 1; Fig. 5 a fragmentary side elevation, similar to Fig. 1, the apparatus being of such character as to compensate for variations in slip due to supply pressure and temperature conditions, as well as variations due to the pressure differential of the meter; Fig. 6 a fragmentary vertical section of portions forming part of the apparatus shown in Fig. 5; Fig. 7 a view similar to Fig. 5, of a modification to compensate for pressure and temperature conditions of the total amount of gas being metered; Fig. 8 a fragmentary detail, on a larger scale, of the parts shown in Fig. 7; Figs. 9 to 14, inclusive, diagrammatic modifications of various means for variably affecting the movement of shaft 17.

In the drawings 10 indicates a meter, in this instance a meter of the rotary impeller type, the displacement elements of the meter being arranged within a gas-tight casing with the shaft 11 thereof projected through the meter casing. Connected to shaft 11 is a counter 12 so proportioned that its reading will indicate, in one form or another, the volume of gas which has passed through the meter in such manner as to cause movement of the impellers or other displacement elements of the meter.

With such an arrangement the counter will not indicate the volume of gas which passes through the meter under such conditions as not to cause movement of the displacement elements and, as the volume of this "slippage" gas is dependent upon time, differential pressure of the meter, supply pressure of the gas, and temperature of the gas, I have provided the following indicating mechanism:

A time train 15, conveniently provided with a time indicator 16, is arranged to drive a shaft 17, through the medium of some mechanism of such character that a given movement of the time train may have a variable effect upon the shaft, in accordance with one or more variables which affect the gas flow. It will be readily understood that many different forms of driving connections between the time train and shaft 17 may be provided without departing from the spirit of my invention and that the various means herein shown are intended to be merely typical and largely diagrammatic in character.

For instance, in Fig. 4 I show an oscillating arm 19 connected by a link 20 with a crank 21 driven by the time train. Arm 19 carries a pawl 22 adapted to act upon a ratchet wheel 23 connected by gears 24 and 25 with shaft 17. Co-acting with pawl 22 in such manner as to vary the effectiveness of pawl 22 upon ratchet wheel 23, in a well-known manner, is an oscillating guard 26 which may be actuated by a link 27.

In Fig. 8 the pawl 22' is carried by arm 19' connected by link 20' with a crank 21' carried by a moving element of the meter 10, said pawl 22' being guarded by the guard 26. In this construction the "slippage" gas is indicated by dial 100, the guard 26 being oscillated by pressure diaphragm 84 and thermostat 86 through the floating beam 90' and link 27.

In Fig. 9 a time-train-driven disc 30 is capable of driving a friction wheel 31 connected by a slip joint 32 with shaft 17, the wheel 31 being automatically shifted with relation to disc 30 through the medium of element 33 under the control of any mechanism 34 which is affected by a variable which is to be accounted for.

In Fig. 10 the variable instrument 34 is connected to a rheostat 35 which controls a motor 36 which in turn drives shaft 17.

In Fig. 11 the Bourdon tube 40 may serve as an element affected both by temperature and pressure, its interior being connected by pipe 41 with the pressure within a desired portion of the gas system and its free end being connected through an arm 42 with a link 43 which may, in turn, be connected to any suitable element which will affect shaft 17, as for instance, the friction wheel 31.

In Fig. 12 the pawl 22" is carried by slotted arm 19" in which is slidably mounted a block 50 connected to element 33 of the variable instrument 34. Pivoted to block 50 is a link 51 connected to a crank 52 driven in any suitable manner as, for instance, by a time-train, a constantly moving element, or a moving element of the meter. Pawl 22" co-acts with the ratchet wheel 23 connected to shaft 17 in the manner already described. In Fig. 13 a small impeller pump or positive pressure motor 60 is connected through pipes 61 and 62 with opposite ends of a cylinder 63. In cylinder 63 is a piston 64 reciprocation of which will cause flow of a fluid through pipes 61 and 62 and motor 60 in the direction indicated by the arrows, the motor being connected to shaft 17.

Piston 64 may be reciprocated by a crank 52 through the medium of a link 51, block 50, slotted arm 19", element 33 and variable instrument 34.

Many other mechanisms capable of accomplishing the desired result will readily suggest themselves to any competent mechanic.

In order to impress the movement of shaft 17 upon counter 12 without interfering with the impressment of movement of the displacement elements of meter 10 upon said counter 12, I introduce into the connection between shaft 11 and counter 12 a differential gearing 70 of well-known form and connect the primary gear of said differential 70 with a worm 71 carried by shaft 17, the parts being so proportioned that movement of shaft 17 will serve to advance counter 12 without interfering with the advancement of said counter by shaft 11.

It will now be apparent that by providing any sort of mechanism by which the movement of shaft 17 will be automatically modified in accordance with the various variables which will affect and effect the "slippage" flow of gas through the meter, it will be possible to accurately integrate into the counter 12 such "slippage" flow.

For this purpose, in Fig. 1 I provide a diaphragm element 80 one side of which is connected by pipe 81 with the inlet of the meter and the other side of which is connected by pipe 82 with the outlet side of the meter, the diaphragm being connected to a shaft 83 (Figs. 1 and 4) connected to link 27. This arrangement takes account only of the pressure differential of the meter as affecting flow of "slippage" gas.

In Fig. 5 the diaphragm element 80 is connected by pipes 81 and 82 with the inlet and outlet sides of the meter respectively; a second diaphragm chamber 84 is connected by pipe 85 with the inlet side of the meter, through pipe 81, and a thermostat 86 is arranged in position to be affected by the temperature of the flowing gas (in the present instance assumed to be the same as atmospheric temperature). Rod 83', corresponding to rod 83 in Fig. 4, is connected to the guard 26 (or other element which is to determine the effect of the time-train upon shaft 17) is connected to a beam 87 connected at one end to a rod 88 connected to the diaphragm of chamber 80, and at the other end is connected to a link 89 which in turn is connected to a beam 90 connected at one end with a rod 91 connected with the rod of element 84 and at the other end connected to a rod 92 connected with the thermostat 86, the arrangement being such that the variables 80, 84 and 86 will affect rod 83' in such manner as to vary and control the movement of shaft 17 in a manner to make proper allowance for the various variables which affect the flow of "slippage" gas.

It will be readily understood that it would not be feasible to attempt to shown in accurate proportion, the elements which have been described. But it will be readily apparent that any one ordinarily skilled in the art of metering gas will be able, by well-known methods of computation, to determine these proportions.

As it is often convenient to know the volume of "slippage" gas, the counter 100 may be provided and geared to ratchet wheel 23 by any suitable train of gears such as gears 101 (Fig. 6).

In Fig. 7 the rod 27 is connected to beam 90' which is connected by rods 91' and 92' with diaphragm chamber 84' and thermostat 86' respectively, and rod 27 is connected to guard 26 (Fig. 8) so that the effect of ratchet 22' upon counter 12 will be varied in accordance with the variations of supply pressure and temperature, the diaphragm chamber 84' being connected by pipe 85' with the supply side of the meter.

In this arrangement, in order to take care of the "slippage" gas when the demand is not sufficient to cause movement of the displacement elements of the meter 10, I provide a clock 16 and time-train as shown in Fig. 4, the diaphragm chamber 80 being connected by pipe 81 with the supply side of the meter and by pipe 82 with the discharge side and the time-train operating a counter 100 (as in Figs. 5 and 6).

In Fig. 14 the construction indicated is quite similar to that shown in Fig. 10, except that the motor 360, instead of operating continuously, is variably controlled, from rest to full speed, by controller 350, the position of which is determined from the pressure diaphragm in chamber 34, in the manner already described. It is thought that it is not necessary to illustrate in detail the controlling mechanism because such controlling mechanism is well-known, as for instance, in spring motors used for driving phonograph records.

This construction will be so adjusted that, when no gas is flowing through the meter, the motor 360 will be at rest but, as the pressure differential of the meter increases the controller 350 will release the motor and permit it to operate at a speed commensurate with the pressure differential.

It will be understood that, while my invention is primarily designed for gas meters, that nevertheless, it may be used in connection with other fluid meters.

I claim as my invention:

1. The combination of a fluid meter having an inlet and outlet and of a type permitting leakage from inlet to outlet, an indicator for indicating volumes passing through the meter, a driving train dependant upon meter movement for actuating said indicator, a second driving train connected with said indicator, and means for driving said second driving train in accordance with leakage flow through said meter.

2. The combination of a fluid meter having an inlet and outlet and of a type permitting leakage from inlet to outlet, an indicator, indicator actuating mechanism controlled by movement of a meter element, and a second indicator-actuating mechanism acting on said indicator and controlled by the condition of the supplied fluid and measuring leakage flow through the meter.

3. The combination of a fluid meter having an inlet and an outlet and of a type permitting leakage from inlet to outlet, an indicator, a driving train between a moving element of the meter and said indicator, a time train, a driving connection between said time train and indicator, and means dependant upon the pressure differential between the inlet and outlet of the meter for variably affecting the effect of the time train on said driving connection between the time train and indicator.

4. The combination of a fluid meter having an inlet and an outlet and of a type permitting leakage from inlet to outlet, an indicator, a driving train between a moving element of the meter and said indicator, a time train, a driving connection between said time train and indicator, and means dependant upon the pressure differential between the inlet and outlet of the meter for variably affecting the effect of the time train on said driving connection between the time train and indicator, said means comprising a pressure device connected to said inlet and said outlet, and an element affected by said pressure device and affecting the connection between the time train and second driving train.

5. The combination of a fluid meter having an inlet and an outlet and of the type permitting leakage from said inlet to said outlet, an indicator driving train connected to a moving element of the meter and a second indicator driving train comprising a time train, a power delivery element, and an intermediate structure, between the time train and power delivery element, for variably affecting the effect of the time train on the power delivery element, and means, dependant upon a variable affecting leakage flow, for acting on said intermediate element.

6. The combination of a fluid meter having an inlet and an outlet and of the type permitting leakage from said inlet to said outlet, an indicator driving train connected to a moving element of the meter, and a second indicator driving train comprising a time train, a power delivery element, an intermediate structure, between the time train and power delivery element, for variably affecting the effect of the time train on the power delivery element, a pressure controlled element, connections between said pressure controlled element and the inlet and outlet sides of the meter, and connections between said pressure controlled element and said intermediate structure.

7. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter connections between said pressure controlled element and said intermediate structure, a second pressure controlled element, connections between said second pressure controlled element and the inlet side of the meter, and connections between said second pressure controlled element and said intermediate structure.

8. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter, connections between said pressure controlled element and said intermediate structure, a second pressure controlled element, connections between said second pressure controlled element and the inlet side of the meter, connections between said second pressure controlled element and said intermediate structure, a temperature controlled element, and connections between said temperature controlled element and said intermediate element.

9. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter, connections between said pressure controlled element and said intermediate structure, an indicator, connections between said indicator and the first-mentioned indicator driving train, and connections between the power delivery element of the second indicator driving train and said indicator.

10. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter, connections between said pressure controlled element and said intermediate structure, a second pressure controlled element, connections between said second pressure controlled element and the inlet side of the meter, connections between said second pressure controlled element and said intermediate structure, an indicator, connections between said indicator and the first mentioned indicator driving train, and connections between the power delivery element of the second indicator driving train and said indicator.

11. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter, connections between said pressure controlled element and said intermediate structure, an indicator, connections between said indicator and the first mentioned indicator driving train, and connections between the power delivery element of the second indicator driving train and said indicator.

12. The combination of a fluid meter having an inlet and an outlet and of the type permitting leakage from said inlet to said outlet, an indicator driving train connected to a moving element of the meter, a second indicator driving train comprising a time train, a power delivery element, and an intermediate structure, between the time train and power delivery element, for variably affecting the effect of the time train on the power delivery element, a pressure controlled element, connections between said pressure controlled element and the inlet and outlet sides of the meter, connections between said pressure controlled element and said intermediate structure, a second pressure controlled element, connections between said second pressure controlled element and the inlet side of the meter, connections between said second pressure controlled element and said intermediate structure, a temperature controlled element, connections between said temperature controlled element and said intermediate structure, an indicator, connections between said indicator and the first mentioned indicator driving train, and connections between the power delivery element of the second indicator driving train and said indicator.

13. The combination of a fluid meter having an inlet and outlet, indicator actuating mechanism controlled by movement of a meter element, and means for driving said indicator in accordance with the absolute pressure and temperature of the volumes passing through the meter.

14. The combination of a fluid meter having an inlet and outlet and of the type permitting leakage from said inlet to said outlet, indicator actuating mechanism controlled by movement of a meter element, and means for driving said indicator in accordance with the absolute pressure and temperature of the volumes passing through the meter; and a second indicator-actuating mechanism controlled by and measuring leakage flow through the meter.

15. The combination of a fluid meter having an inlet and outlet and of the type permitting leakage from said inlet to said outlet, indicator actuating mechanism controlled by movement of a meter element, and means for driving said indicator in accordance with the absolute pressure and temperature of the volumes passing through the meter.

In witness whereof, I have hereunto set my hand at Connersville, Indiana, this thirteenth day of August, A. D. one thousand nine hundred and twenty five.

CARL R. HOUGHTON.